Patented July 8, 1947

2,423,689

UNITED STATES PATENT OFFICE 2,423,689

SODA LIME COMPOSITION

Morgan R. Day, North Scituate, Mass., assignor to Dewey and Almy Chemical Company, North Cambridge, Mass., a corporation of Massachusetts No Drawing. Application May 18, 1945, Serial No. 594,595

2 Claims. (Cl. 252—192)

This invention relates to gas absorbents, particularly to gas absorbents of the soda lime type, and is concerned with the production of military soda limes which must possess increased resistance to hydrocyanic acid gas and phosgene.

The present military limes are produced by mixing lime and kieselguhr in proportions which may vary somewhat, and then drenching the mixture with a solution of sodium hydroxide. The manufacturing procedure is to pack the wet paste into pans where it hardens, due both to loss of water from the sodium hydroxide solution and to the formation of sodium silicate from the reaction between sodium hydroxide and kieselguhr. The cakes are further dried and then granulated. Ultimately, the granules are packed in the canisters of gas absorbing apparatus.

A typical military lime, composed of calcium hydroxide, sodium hydroxide and kieselguhr, has a rating of 50 minutes against hydrocyanic acid gas, and 17 minutes against phosgene. This rating is determined by the Standard Chemical Warfare Service Test Specifications which are that a 10 cm. depth of 8 to 16 sieve size soda lime is packed into a glass tube of approximately 2 cm. inside diameter. Air at 50% relative humidity, 25° C., containing 3.3 mgs. of hydrocyanic acid gas per liter of air, is forced through the apparatus. No detectable amount of hydrocyanic acid must exist in the outflowing gas until 50 minutes have elapsed.

The testing apparatus used to determine the resistance to phosgene is the same. The requirements however are that when the concentration of phosgene per liter of incoming air is 40.0 mgs. per liter of air, no more than 0.045 mgs. of phosgene per liter of air, must exist in the outflowing gas until 17 minutes have elapsed.

Since phosgene and hydrocyanic acid gas are dangerous military gases, an increase in the life of soda lime against both phosgene and hydrocyanic acid gas is of great importance. It is also important to increase the hardness of the lime, for hardness determines the resistance to powdering and dusting which the lime exhibits when in the canister.

I have discovered that the life of soda lime against both hydrocyanic acid gas and phosgene is greatly increased and that the hardness of the lime is also materially increased when small amounts of zinc are added to the mixture. Numerous zinc salts may be used, such as sulphate and the chloride, but I find it preferable to use zinc oxide and add 10% of this to the dry ingredients of the initial mix. The preferable formulation is as follows wherein there is included an amount of a zinc compound equivalent in zinc to 10 parts of zinc oxide:

| | Parts by weight |
|---|---|
| Hydrated chemical lime | 69.75 |
| Kieselguhr | 15.00 |
| Zinc oxide | 10.00 |
| Sodium hydroxide (40% solution) | ¹ 5.25 |
| Water | Sufficient to form a paste |

¹ Dried basis.

The materials are carefully mixed in the presence of water. Then lumps of the material are dried. After drying, the lumps are granulated, screened to size and remoistened by flowing the granules past an atomizing jet of water until the moisture content rises to between 11 and 13%.

The increased time of effective absorption which the invention secures is shown by the following comparison:

| Composition of gas at input. | 3.3 mgms. HCN per liter of air | 40.0 mgs. COCl₂ per liter of air. |
|---|---|---|
| Absorbent | 10 cm. depth in 2 cm. tube 8 to 16 mesh granules. | 10 cm. depth in 2 cm. tube 8 to 16 mesh granules. |
| | Minutes before detectable quantity issues from test apparatus | Minutes before more than 0.045 mgms. COCl₂ per liter of air issues from apparatus |
| Zinc-Soda-Lime | 200 | 40 |
| Standard Soda Lime (Specification #A-322) | 50 | 17 |

I claim:

1. A granular gas absorbent composition consisting essentially of the reaction product of 69.75 parts by weight of hydrated lime, 15 parts by weight of kieselguhr, 5.25 parts by weight of sodium hydroxide, an amount of a zinc compound selected from the group consisting of zinc sulphate, zinc chloride and zinc oxide equivalent in zinc to 10 parts by weight of zinc oxide and water in amount sufficient to form a paste.

2. That improvement in the art of producing a granular gas absorbent composition which consists in mixing hydrated chemical lime 69.75 parts by weight, kieselguhr 15 parts by weight, an amount of a zinc compound selected from the group consisting of zinc sulphate, zinc chloride and zinc oxide equivalent in zinc to zinc oxide 10 parts by weight, and sodium hydroxide 5.25 parts by weight with sufficient water to form a paste, drying the reaction product to lump form, granulating the lump and remoistening the granulated mass until the moisture content rises to between 11 and 13%.

MORGAN R. DAY.

REFERENCES CITED

The following references are of record in the file of this patent:

UNITED STATES PATENTS

| Number | Name | Date |
|---|---|---|
| 1,520,437 | Pipkin | Dec. 23, 1924 |
| 1,538,650 | Peacock et al. | May 19, 1925 |

FOREIGN PATENTS

| Number | Country | Date |
|---|---|---|
| 392,613 | Great Britain | May 22, 1933 |